United States Patent
Brown (10) Patent No.: US 6,437,795 B1
(45) Date of Patent: Aug. 20, 2002

(54) METHOD AND APPARATUS FOR CLIPPING A FUNCTION

(75) Inventor: Russell A. Brown, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/358,284

(22) Filed: Jul. 21, 1999

(51) Int. Cl.$^7$ .................. G06T 15/30; G06T 11/00; G06T 11/40
(52) U.S. Cl. ................. 345/620; 345/619; 345/581
(58) Field of Search .................. 345/429, 581, 345/619, 620, 582, 647, 623; 348/251

(56) References Cited

U.S. PATENT DOCUMENTS

| | | |
|---|---|---|
| 3,816,726 A | 6/1974 | Sutherland et al. |
| 4,646,251 A | 2/1987 | Hayes et al. |
| 4,918,626 A | 4/1990 | Watkins et al. |
| 5,361,386 A * | 11/1994 | Brown et al. ............... 345/647 |
| 5,381,519 A | 1/1995 | Brown et al. |
| 5,675,380 A * | 10/1997 | Florent et al. ............... 348/251 |
| 5,809,219 A | 9/1998 | Pearce et al. |

FOREIGN PATENT DOCUMENTS

| | | |
|---|---|---|
| EP | 0 319 165 | 6/1989 |
| EP | 0 637 814 | 2/1995 |

OTHER PUBLICATIONS

Sutherland, I. and Hodgman, G., "Reentrant Polygon Clipping," Communications of the ACM, Jan. 1974, vol. 17, No. 1.

Brown, R., "Modeling Specular Highlights Using Bézier Triangles," The SML Technical Report Series, Sep. 1999, Sun Microsystems Laboratories, Sun Microsystems, Inc., Palo Alto, California.

Phong, B.T., "Illumination for Computer Generated Pictures," Communications of the ACM, Jun. 1975, pp. 311–317, vol. 18, No. 6.

Blinn, J., "Models of Light Reflection for Computer Synthesized Pictures," Proc. Siggraph 77, pp. 192–198, vol. 11, No. 2, ACM Press, New York.

Duff, T., "Smoothly Shaded Renderings of Polyhedral Objects on Raster Displays," Proc. Siggraph 79, pp. 270–275, vol. 13, No. 2, ACM Press, New York.

Bishop, G. and Weimer, D., "Fast Phong Shading," Proc. Siggraph 86, pp. 103–106, vol. 20, No. 4, ACM Press, New York.

Shantz, M. and Lien, S., "Shading Bicubic Patches," Proc. Siggraph 87, pp. 189–196, vol. 21, No. 4, ACM Press, New York.

Kirk, D. and Voorhies, D., "The Rendering Architecture of the DN10000VS," Computer Graphics, Aug. 1990, pp. 299–307, vol. 24, No. 4.

(List continued on next page.)

Primary Examiner—Matthew Luu
Assistant Examiner—Chante' Harrison
(74) Attorney, Agent, or Firm—Gunnison, McKay & Hodgson, L.L.P.; Philip J. McKay (57) ABSTRACT

The invention is a method and apparatus for clipping a function, such as a quadratic Bezier function defining a shading characteristic of an object being modeled. In accordance with the invention, a second or higher order function is clipped in "linear" fashion using barycentric coordinates. In accordance an embodiment of the invention, the method comprises the steps of determining a second or higher order function to be clipped, determining barycentric coordinates for at least one clipping point associated with a first order (i.e. linear) function associated with the second or higher order function and generating at least one clipping point associated with the second or higher order function using the barycentric coordinates. In one or more embodiments of the invention, the method includes the steps of using the barycentric coordinates to determine a reparameterized clipped function.

20 Claims, 5 Drawing Sheets

OTHER PUBLICATIONS

Seiler, L., "Quadratic Interpolation for Near–Phong Quality Shading," Siggraph 98 technical sketch, 1998.

Kuijk, A.A.M. and Blake, E.H., "Faster Phong Shading via Angular Interpolation," Computer Graphics Forum 8, 1989, pp. 315–324, North–Holland, the Netherlands.

Bergman, L., Fuchs, H., and Grant, E., "Image Rendering by Adaptive Refinement," Proc. Siggraph 86, pp. 29–37, vol. 20, No. 4, ACM Press, New York.

Harrison, K., Mitchell, D.A.P. and Watt, A.H., "The H Test—a Method of High Speed Interpolative Shading," Proc. CG International '88, 1988, pp. 106–116, Springer, Berlin.

Farin, G., "Bézier Triangles," Curves and Surfaces for Computer–Aided Geometric Design, Fourth Edition, 1988, pp. 279–307, Academic Press, San Diego.

Farin, G., "The de Casteljau Algorithm," Curves and Surfaces for Computer–Aided Geometric Design, Fourth Edition, 1988, p. 38, Academic Press, San Diego.

Fuchs, H., Goldfeather, J., Hultquist, J., Spach, S., Austin, J., Brooks, F., Jr., Eyles, J., and Poulton, J., "Fast Spheres, Shadows, Textures, Transparencies, and Image Enhancements in Pixel–Planes," Proc. Siggraph 85, 1988, pp. 111–120, vol. 19, No. 3, ACM Press, New York.

Heckbert, P. and Moreton, H., "Interpolation for Polygon Texture Mapping and Shading," In State of the Art in Computer Graphics: Visualization and Modelling, D.F. Rogers and R.A. Earnshaw (eds.), 1991, pp. 101–111, Springer–Verlag, New York.

Blinn, J., "Hyperbolic Interpolation," IEEE CG&A, 1992, pp. 89–94, vol. 12, No. 4.

Newman, W.M. and Sproull, R.F., "Three–Dimensional Transformations and Perspective," Principles of Interactive Computer Graphics, Second Edition, 1979, pp. 333–366, McGraw–Hill, Tokyo.

Gouraud, H., "Continuous Shading of Curved Surfaces," IEEE Transactions on Computers, Jun. 1971, vol. C–20, No. 6.

Barnhill, R., "Representation and Approximation of Surfaces," Mathematical Software III, J.R. Rice (ed.), 1997, pp. 69–120, Academic Press, New York.

* cited by examiner

METHOD AND APPARATUS FOR CLIPPING A FUNCTION

BACKGROUND OF THE INVENTION

1. Field of the Invention

This invention relates to methods and apparatus for clipping functions representing models of objects which are computer generated.

2. Background Art

Computer generated images are created from models of objects. It is desirable that the object depicted in a computer generated image resemble the real object to the maximum extent possible. As one aspect of modeling an object, it is desirable to accurately represent the shading of the object. Changes in color and intensity of light reflected by an object across its surface, or its shading, can be very complex. Variations in shading may result from a wide variety of factors such as surface texture, position, orientation, and the type, location and direction of the source of light. To accurately represent shading of a modeled object, high order shading functions may be used.

Another aspect of the modeling process is selecting that portion of the object which is being modeled that will lie within a field of vision. Commonly, an object to be modeled is represented as a number of smaller polygons. Once the object is modeled with the polygons, the polygons are "clipped" to eliminate that portion of the data which represents the modeled object which lies outside of a selected field of view.

The object may be modeled with one or more first degree functions. The polygon(s) used to model the object are planar in their three-dimensional geometric coordinates. The shading function may also be a first degree function representing a set of color or shading coordinates. Each geometric point on the polygon may be represented by coordinates (x,y,z) and the shading at each particular point represented by a color set (red (r), green (g), blue (b)), these coordinates and color sets varying linearly over the polygon.

When the geometric and shading functions are first degree, and are thus linear, as described above, the clipping process requires only linear interpolation of the data. For example, the geometric coordinates for each point where a clipping line or plane intersects the polygon may be determined from linear interpolation from other known points. Likewise, the shading values at the clipped points can be determined by interpolation the shading values linearly from those of known points.

Figure 1:
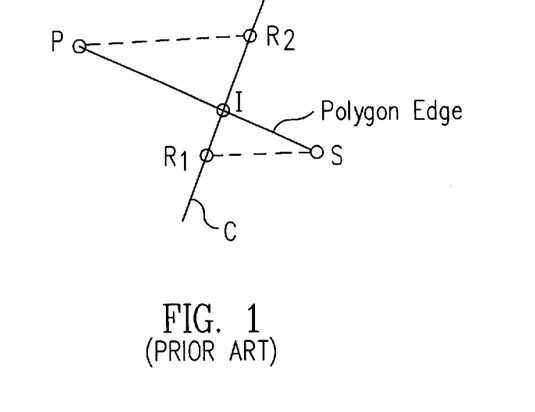
FIG. 1 illustrates a prior art method for determining a linear interpolant for use in linearly interpolating a first order, linear function.

This process of linear clipping is described in U.S. Pat. No. 3,816,726 to Sutherland et al., and in *Reentrant Polygon Clipping* by Sutherland and Hodges (Vol. 17, Number 1, Communications of the ACM, January 1974). These references describe a process whereby a linear interpolant " is used to calculate the intersection point of a clipping line or plane with an edge of a polygon between two vertices of the polygon. The interpolant " is derived from ratios of two similar triangles and the distances between points on the triangles to the clipping line. As provided in these references and referring to FIG. 1, the linear interpolant "=SI/SP=$SR_1$/|$SR_1$+$PR_2$| As described therein, the interpolant " can be applied to other linear functions associated with the polygon, such as color and intensity blending.

A problem is that many functions which are used to model objects are not first order. In order to improve the accuracy of the representation of the object's shading, it is now common to utilize a second or higher degree polynomial shading function. For example, a shading function for an object being modeled may be defined by a quadratic parametric surface. It is not possible to use the simple linear clipping algorithm directly to such a function in order to obtain the coordinates or parameters associated with clipping points (i.e. it is not possible to apply a linear interpolant such as that described above to the second or higher degree shading function). Instead, quadratic or other second degree or higher interpolation is necessary. Such a process is computationally demanding, however, and negates some of the gains realized by using a high order surface to obtain better shading results.

SUMMARY OF THE INVENTION

The invention is a method and apparatus for clipping a function, and in one or more embodiments, defining a new reparameterized clipped function.

An embodiment of the invention comprises a method of effectuating clipping of a second or higher order function in "linear" fashion by using barycentric coordinates.

In accordance an embodiment of the invention, the method comprises the steps of determining a second or higher order function to be clipped, determining barycentric coordinates for at least one clipping point associated with a first order function associated with the second or higher order function and generating at least one clipping point associated with the second or higher order function using the barycentric coordinates.

In one or more embodiments, the barycentric coordinates for at least one clipping point associated with the first order function are determined by linear interpolation. The barycentric coordinates are then substituted into the higher order function to define the clipped point(s) of the higher order function.

In one or more embodiments, the higher order function comprises a quadratic Bezier function defining a quadratic Bezier triangle. The first order function comprises a linear vector-valued function representing a planar triangle associated with the quadratic Bezier triangle.

In one or more embodiments of the invention, the method includes the steps of using the barycentric coordinates to determine a reparameterized clipped function.

In an embodiment where the higher order function comprises a quadratic Bezier function, this step comprises using a blossoming algorithm to generate six reparameterized points which define a new clipped quadratic Bezier function.

In accordance with one or more embodiments, the higher order function is a shading function for an object being modeled.

In one or more embodiments, computer hardware and/or software is arranged to one or more aspects of the method of the invention.

Further objects, features and advantages of the invention will become apparent from the detailed description of the drawings which follows, when considered with the attached figures.

DETAILED DESCRIPTION OF THE INVENTION

The invention is a method and apparatus for providing a clipping function. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun Microsystems and Java are trademarks or registered trademarks of Sun Microsystems, Inc. in the United States and other countries. All SPARC trademarks are used under license and are trademarks or registered trademarks of SPARC International in the United States and other countries.

Method of Providing a Clipping Function

An embodiment of the invention comprises a method for clipping a function. An embodiment of the invention also comprises a method for providing a reparameterized clipped function.

Figure 2:
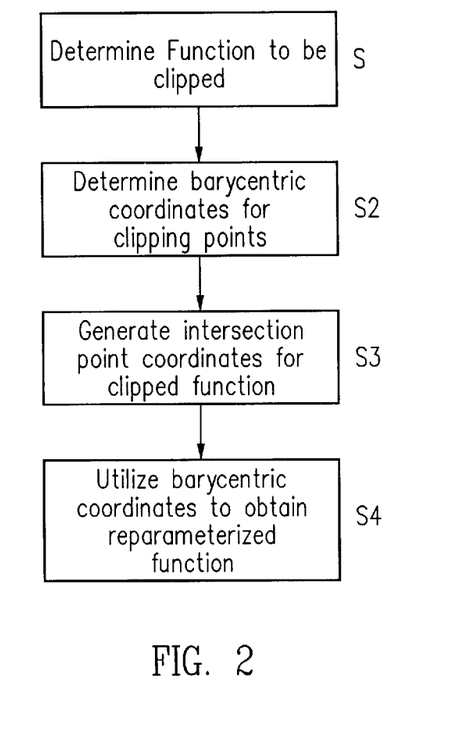
FIG. 2 is a flow diagram illustrating a method of clipping in accordance with an embodiment of the invention.

A first aspect of the invention will be described with reference to FIG. 2. In general, the first aspect of the invention is a method for clipping a second or higher degree function in linear fashion.

A first step S1 of the method comprises determining a second or higher degree or order function. As used herein, the terms "first order," "first degree," "linear" and similar terms are generally intended to mean a function in which no variable thereof is raised to higher than a first power. An example of a first order function is f(x)=2x+5. As used herein, the terms "second or higher order," "second degree" and similar terms are generally intended to mean a function in which at least on variable thereof is raised to higher than a first power. Examples of second or higher order functions are $f(x)=2x^2+9$ and $f(x,y)=x^3+4y^2$.

Second or higher order functions are well known and may comprise cubic, quadratic or other high order polynomial functions. The function may represent one or more features of the object which is being modeled. For example, the function may represent a shading function of an object being modeled. The shading function may comprise a specular highlight function, a simple color function or the like.

Figure 3:
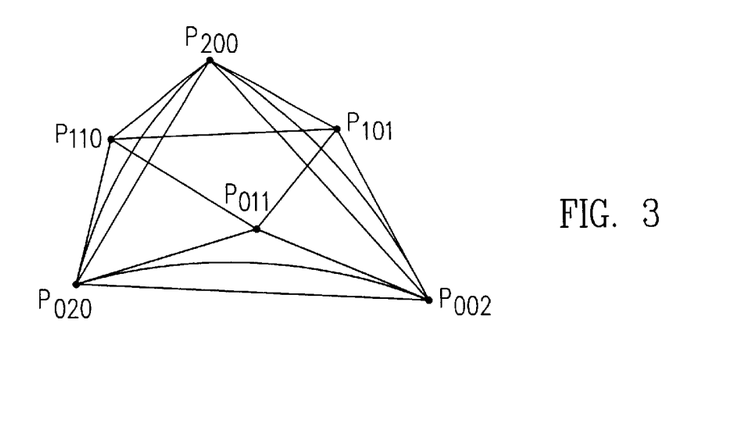
FIG. 3 illustrates a quadratic Bezier triangle representing a shading function.
Figure 4:
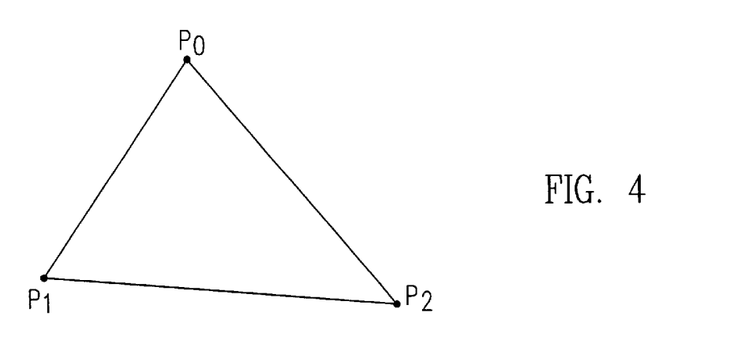
FIG. 4 illustrates a first order planar Bezier triangle associated with the function illustrated in FIG. 3.

The function may comprise a quadratic Bezier shading function as illustrated in FIG. 3. Quadratic shading functions are well known. As illustrated in FIG. 3, such a function defines a quadratic Bezier surface. This surface is defined by six control points $P_{200}$, $P_{020}$, $P_{002}$, $P_{110}$, $P_{011}$ and $P_{101}$.

Second, in a step S2 of the method, barycentric coordinates associated with the function are determined. In one embodiment, the barycentric coordinates are determined from a planar polygon and associated with the higher order surface. In one or more embodiments, the determined barycentric coordinates describe the intersection coordinates of a clipping line or plane with one or more edges of the first degree polygon.

In the case of the function illustrated in FIG. 3, there is associated with the quadratic Bezier surface (defined by the quadratic Bezier function) a planar triangular polygon. This planar triangle can be represented by a first degree or linear function and has vertices $P_0$, $P_1$ and $P_2$ corresponding to the quadratic Bezier surface vertices $P_{200}$, $P_{020}$ and $P_{002}$, respectively.

In accordance with one embodiment of the method, in Step S2, the barycentric coordinates which are obtained correspond to each "clipping point" representing the mathematical intersection of the first degree function with a clipping line or plane. This clipping is visually illustrated in FIG. 5. In the example given, the planar polygon (and ultimately the higher order function with which it is associated, as described below) is clipped by a vertical clipping line C. In one or more embodiments, the clipping line C represents the left-hand edge of a viewport V where that portion of the polygon to the right of the clipping line C is to be retained as visible and that portion of the polygon to the left of the clipping line C to be eliminated.

Figure 5:
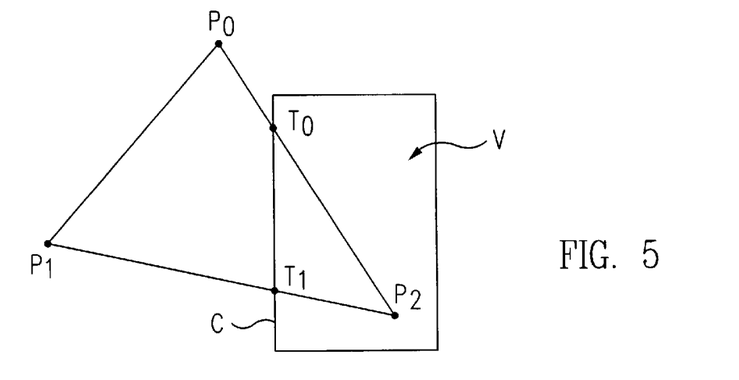
FIG. 5 illustrates the Bezier triangle illustrated in FIG. 4 clipped to a viewport.

In accordance with this step, barycentric coordinates are determined for the points of intersection of the clipping line C and the polygon edges $P_2P_0$ and $P_1P_2$. As illustrated, these points are $T_0$ and $T_1$. Importantly, the coordinates which are obtained for each of these clipping points are their barycentric coordinates.

The relationship between any point on the planar triangle and the barycentric coordinates is a linear (i.e. first order) vector-valued function provided as follows:

$$p(b_0,b_1,b_2)=P_0b_0+P_1b_1+P_2b_2 \tag{1}$$

Using this function and the known barycentric coordinates for the points $P_0$, $P_1$ and $P_2$, the barycentric coordinates for the intersection points $T_0$ and $T_1$ can be obtained. In one or more embodiments, in the method the barycentric coordinates (1,0,0), (0,1,0) and (0,0,1) are associated with the vertices $P_0$, $P_1$ and $P_2$, and then the barycentric coordinates for the points of intersection are determined. Most importantly, because the relationship of the barycentric coordinates to any point on the polygon is linear, linear interpolation may be used to determine the barycentric coordinates for any point on the polygon.

Next, in a step S3, the barycentric coordinates determined in step S2 are used to interpolate points on the quadratic or other second degree or higher function. These coordinates are obtained using the following equation when the function is a quadratic Bezier function (with reference to the points illustrated in FIG. 3):

$$p(b_0,b_1,b_2)=P_{200}b_0^2+P_{020}b_1^2+P_{002}b_2^2+2P_{110}b_0b_1+2P_{011}b_1b_2+2P_{101}b_2b_0 \tag{2}$$

This equation relates each point on the planar polygon, by its barycentric coordinates, to a particular point on the quadratic surface.

Figure 6:
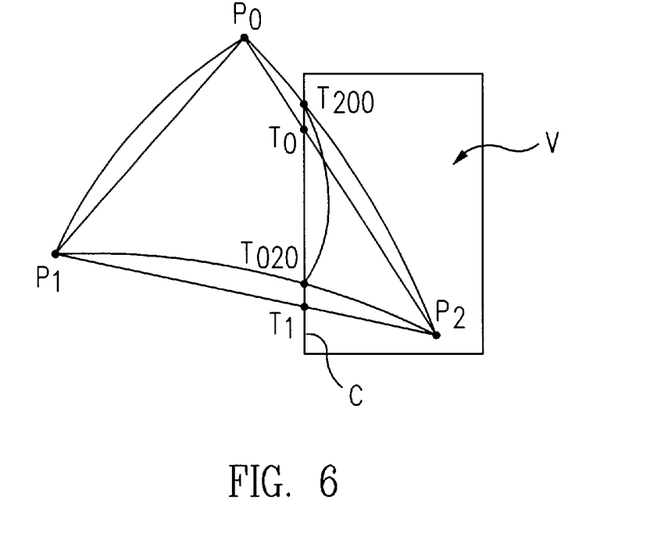
FIG. 6 illustrates the quadratic Bezier triangle associated with the first order Bezier triangle clipped to the viewport as in FIG. 5.

FIG. 6 graphically illustrates the quadratic Bezier surface associated with the planar triangle in the clipping arrangement. Using equation (2) the points $T_{020}$ and $T_{200}$ associated with the higher order function/surface are determined using the barycentric coordinates for points $T_1$ and $T_0$, respectively. The points $T_{020}$ and $T_{200}$ are points on the clipped quadratic function.

Once determined, the points $T_{020}$ and $T_{200}$, along with point $P_2$ (which has been relabeled point $T_{002}$ in FIG. 7) comprise the three vertices of the newly clipped quadratic Bezier function.

In accordance with the above-described aspect of the invention, there is provided a method for linearly interpolating a second or higher degree function. The method takes advantage of the properties of barycentric coordinates to substantially reduce the computational complexity associated with clipping high order functions.

The method of steps S1–S3 yields only new clipping vertice points for the high order function. When the function which is being clipped is a shading or similar function, it is desirable to determine more than just the clipping points for the function. It is desirable to determine the new clipped function for use in the creation of data and raster conversion for generating an image output, such as in the case of a computer.

For example, in order to compute shading, such as specular highlights associated with portion of the object being modeled with the clipped surface, it is necessary to create a completely new clipped highlight function. In this manner, the shading at each point across the newly clipped surface can be determined.

Thus, in accordance with another aspect of the invention, there is provided a method for generating a reparameterized clipped function using the barycentric coordinates determined in step S2.

Referring to FIG. 2 again, and in accordance with another aspect of the invention, in a step S4 a reparameterized clipped function is generated. In accordance with this step, the barycentric coordinates for the vertices of the function (including the barycentric coordinates for the one or more clipped points determined in step S2) are utilized to determine the reparameterized and clipped function.

Figure 7:
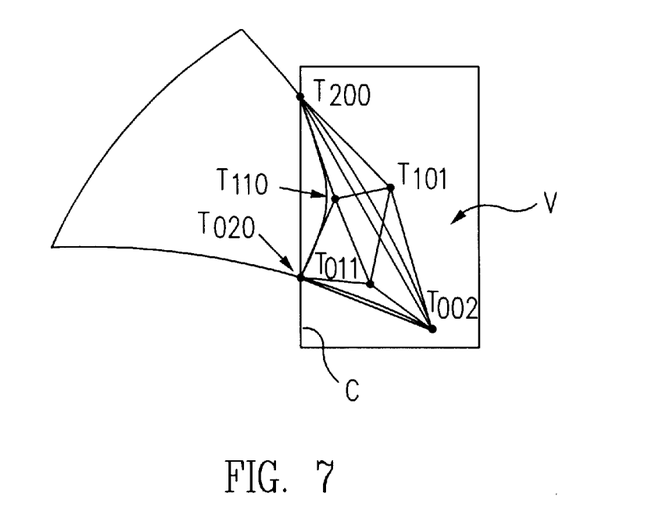
FIG. 7 illustrates a new quadratic shading function after clipping.

In the embodiment where the shading function is a quadratic Bezier function six control points are necessary to define the surface. Referring to FIG. 7, these six points comprise the three vertices $T_{200}$, $T_{020}$ and $T_{002}$, plus three additional points associated with the midpoints of each of the curves referred to above, these points being illustrated as $T_{101}$, $T_{110}$ and $T_{011}$.

In accordance with a step S4 of the method, barycentric coordinates are utilized to obtain these six control points and for defining a reparameterized and clipped function. In accordance with one embodiment of the method, a blossoming algorithm is utilized to determine reparameterized values for these six points. As a first aspect of this step, the equation representing the function being clipped is expressed as a recursive de Casteljau formulation. In the case of the function listed above, this formulation is as follows (the formulation is equation (2) above, rewritten):

$$p(b_0, b_1, b_2) = (P_{200}b_0 + P_{110}b_1 + P_{101}b_2)b_0 + \quad (3)$$
$$(P_{110}b_0 + P_{020}b_1 + P_{011}b_2)b_1 +$$
$$(P_{101}b_0 + P_{011}b_1 + P_{002}b_2)b_2$$

Next, the parameters $(d_0, d_1, d_2)$ are substituted for the barycentric coordinates outside of the parenthesis, and "T" (the desired control point) is then represented as:

$$ab\ T[(b_0, b_1, b_2), (d_0, d_1, d_2)] = \quad (4)$$
$$(P_{200}b_0 + P_{110}b_1 + P_{101}b_2)d_0 +$$
$$(P_{110}b_0 + P_{020}b_1 + P_{011}b_2)d_1 +$$
$$(P_{101}b_0 + P_{011}b_1 + P_{002}b_2)d_2$$

A particular point T is then obtained by substituting appropriate pairs of barycentric coordinates in this equation to obtain reparameterized control points $T_{200}$, $T_{020}$, $T_{002}$, $T_{101}$, $T_{110}$ and $T_{011}$. The barycentric coordinates which are substituted comprise the barycentric coordinates for the points of the clipped base polygon, i.e. $T_0$, $T_1$ and $P_2$ in FIG. 6.

If the barycentric coordinates for the point To comprise $(b_0,b_1,b_2)_0$, the barycentric coordinates for the point $T_1$ comprise $(b_0,b_1,b_2)_1$ and the barycentric coordinates for $P_2$ comprise $(b_0,b_1,b_2)_2$, the following table illustrates the combinations of barycentric coordinate substitutions in the above-equation (4) to obtain each of the six control points for the surface.

| Control Point To Be Obtained | $(b_0,b_1,b_2)$ | $(d_0,d_1,d_2)$ |
|---|---|---|
| $T_{200}$ | $(b_0,b_1,b_2)_0$ | $(b_0,b_1,b_2)_0$ |
| $T_{020}$ | $(b_0,b_1,b_2)_1$ | $(b_0,b_1,b_2)_1$ |
| $T_{002}$ | $(b_0,b_1,b_2)_2$ | $(b_0,b_1,b_2)_2$ |
| $T_{110}$ | $(b_0,b_1,b_2)_0$ | $(b_0,b_1,b_2)_1$ |
| $T_{011}$ | $(b_0,b_1,b_2)_1$ | $(b_0,b_1,b_2)_2$ |
| $T_{101}$ | $(b_0,b_1,b_2)_2$ | $(b_0,b_1,b_2)_0$ |

In this method, all of the control points defining the new quadratic Bezier function, being both clipped and reparameterized, are determined.

It should be appreciated that equations (1)–(4) apply to triangles only (i.e. 3 points) any polygon associated with a function which is being used to model an object must be decomposed into a set of triangles prior to applying the equations of the method.

Embodiment of a Computer Execution Environment (Hardware)

Figure 8:
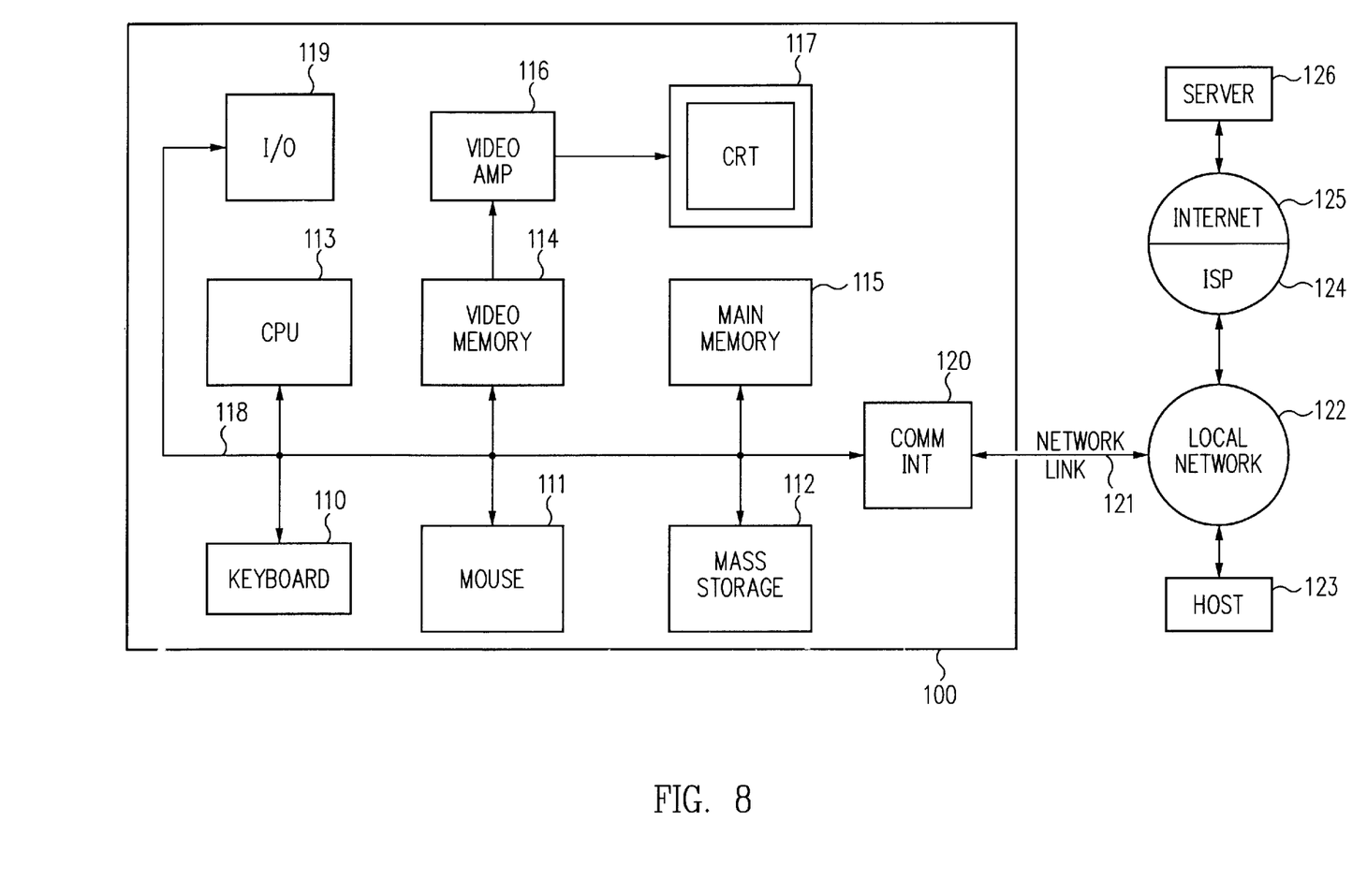
FIG. 8 diagrammatically illustrates one embodiment of a computer system capable of providing a suitable execution environment for an embodiment of the invention.

An embodiment of the invention can be implemented as computer software in the form of computer readable code executed on a computer 100 or other device, such as that illustrated in FIG. 8, or in the form of bytecode class files executable within a runtime environment (such as, e.g., a Java™ runtime environment) running on such a computer or other device, or in the form of bytecodes running on a processor (or devices enabled to process bytecodes) existing in a distributed environment (e.g., one or more processors on a network).

The computer 100 illustrated in FIG. 8 includes a keyboard 110 and mouse 111 coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, all coupled to system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as the SPARC™ microprocessor, or a microprocessor manufactured by Motorola, such as the 680×0 processor, or a microprocessor manufactured by Intel, such as the 80×86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor or display 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

Figure 9:
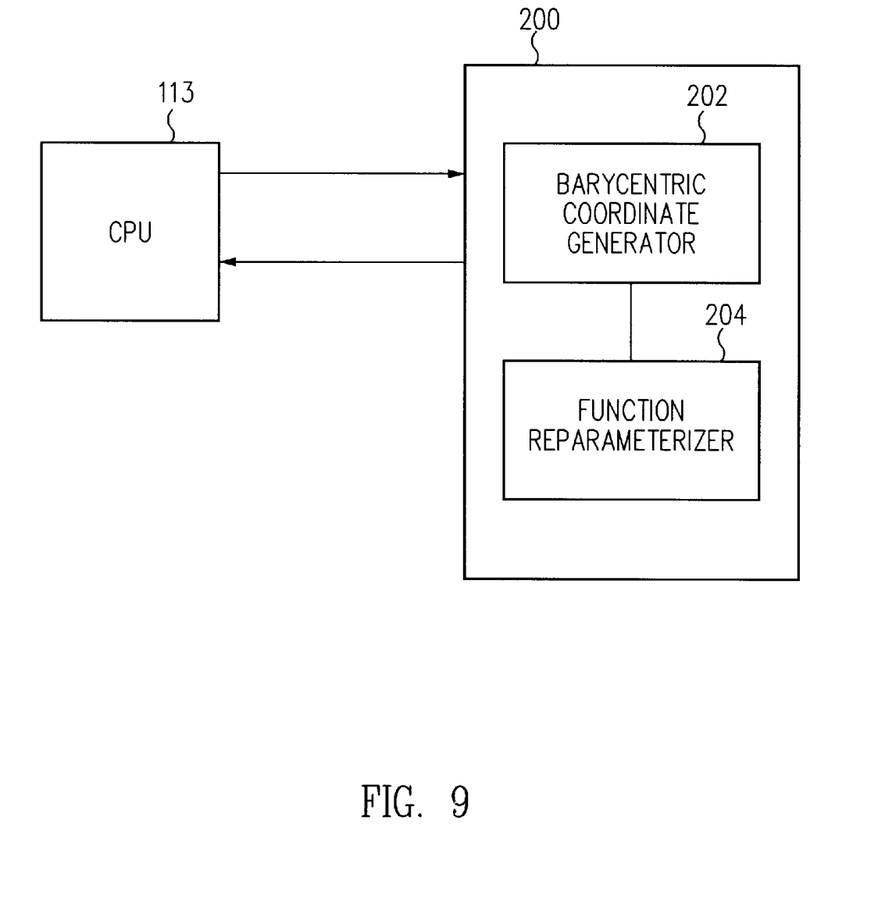
FIG. 9 diagrammatically illustrates one embodiment of a clipping and reparameterizing system for use with the computer system illustrated in FIG. 2.

In one or more embodiments, the computer 100 and/or CPU 113 may include a clipping system 200, such as that illustrated in FIG. 9. Such a system 200 may comprise hardware and/or software associated with the computer 100 and/or CPU 113.

In the arrangement illustrated in FIG. 9, the system 200 includes a barycentric coordinate generator 202 for generating barycentric coordinates for a clipped function such as in accordance with steps S1–S3 of the method described above. In addition, the system 202 includes a function reparameterizer 204 for defining a clipped and reparameterized function such as in accordance with step S4 of the method described above.

Of course, the foregoing description is that of preferred embodiments of the invention, and various changes and modifications may be made without departing from the spirit and scope of the invention, as defined by the claims.

What is claimed is:

1. A method of clipping a function comprising:
   determining a non-linear function representing a feature of an object being modeled;
   associating a linear polygon with said non-linear function, wherein vertices of said linear polygon are represented by a first set of barycentric coordinates;
   determining a second set of barycentric coordinates representing a plurality of intersection points between said linear polygon and a clipping object, wherein each of said second set of barycentric coordinates represents one of said plurality of intersection points between said clipping object and said linear polygon; and
   generating at least one clipping point associated with said non-linear function using said second set of barycentric coordinates.

2. The method of claim 1 wherein said non-linear function comprises a quadratic Bezier function.

3. The method of claim 1 wherein said linear polygon comprises a function representing a planar triangular polygon.

4. The method of claim 1 wherein said clipping object represents a viewport having at least one edge, wherein said intersection points occur at one edge of said at least one edge of said viewport.

5. The method of claim 1 wherein said clipping object is a straight line.

6. The method of claim 1 wherein said determining said second set of barycentric coordinates comprises using linear interpolation between two vertices of said linear polygon.

7. The method of claim 1 wherein said generating said at least one clipping point associated with said non-linear function comprises:
   using an equation relating barycentric coordinates of each point on said linear polygon to a corresponding point on said non-linear surface; and
   determining each of said at least one clipping point associated with said non-linear function from said equation using said second set of barycentric coordinates.

8. The method of claim 1 wherein portions of said non-linear function within said viewport comprises a clipped function.

9. The method of claim 1 wherein said non-linear function is a shading function associated with an object to be modeled.

10. The method of claim 8 wherein each of said at least one clipping point associated with said non-linear function comprises a vertex of said clipped function.

11. A computer program product comprising:

a computer usable medium having computer readable program code embodied therein for clipping a function, said computer readable program code configured to cause a computer to:

determine a non-linear function representing a feature of an object being modeled;

associate a linear polygon with said non-linear function, wherein vertices of said linear polygon are represented by a first set of barycentric coordinates;

determine a second set of barycentric coordinates representing a plurality of intersection points between said linear polygon and a clipping object, wherein each of said second set of barycentric coordinates represents one of said plurality of intersection points between said clipping object and said linear polygon; and generate at least one clipping point associated with said non-linear function using said second set of barycentric coordinates.

12. The computer program code of claim 11 wherein said non-linear function comprises a quadratic Bezier function.

13. The computer program code of claim 11 wherein said linear polygon comprises a function representing a planar triangular polygon.

14. The computer program code of claim 11 wherein said clipping object represents a viewport having at least one edge, wherein said intersection points occur at one edge of said at least one edge of said viewport.

15. The computer program code of claim 11 wherein said clipping object is a straight line.

16. The computer program code of claim 11 wherein said determining said second set of barycentric coordinates comprises using linear interpolation between two vertices of said linear polygon.

17. The computer program code of claim 11 wherein said generating said at least one clipping point associated with said non-linear function comprises:

using an equation relating barycentric coordinates of each point on said linear polygon to a corresponding point on said non-linear surface; and determining each of said at least one clipping point associated with said non-linear function from said equation using said second set of barycentric coordinates.

18. The computer program code of claim 11 wherein portions of said non-linear function within said viewport comprises a clipped function.

19. The computer program code of claim 11 wherein said non-linear function is a shading function associated with an object to be modeled.

20. The computer program code of claim 18 wherein each of said at least one clipping point associated with said non-linear function comprises a vertex of said clipped function.

* * * * *